INVENTOR
CORNELIS DE KONING.
BY
Frank R. Trifari
AGENT 3,102,170

DEVICE FOR SELECTIVELY ERASING TWO OR MORE ADJACENT MAGNETIC TRACKS OF A MAGNETIC TAPE

Cornelis de Koning, Eindhoven, Netherlands, assignor to North American Philips Company Inc., New York, N.Y., a corporation of Delaware Filed Feb. 10, 1960, Ser. No. 7,891
Claims priority, application Netherlands Feb. 12, 1959
2 Claims. (Cl. 179—100.2)

The invention relates to a device for selectively erasing two or more adjacent signal tracks on a magnetic tape by means of two or more erasing heads, the gaps of which are aligned.

In the film and record industries a steadily increasing use is being made of the technique in which more than one signal is recorded on a single tape. This is usually carried out by "writing" two or more tracks side by side on one tape with small spaces between the tracks.

The invention has for its object to provide a device by which one or more of these signal tracks can be erased at will without affecting any of the other tracks to any appreciable extent.

In accordance with the invention the windings on every two adjacent erasing heads are wound differently so that an alternating current applied across the winding of one head induces substantially no alternating current in the winding of the other.

The magnetic circuit of each of the erasing heads may, in accordance with the invention, be formed by three legs; the windings for each two directly adjacent erasing heads are wound differently, so that in the two outer legs of one of these two heads the flux obtained is at any instant in the same direction, while in the two outer legs of the other head of the pair the flux obtained is at any instant in opposite directions.

If the number of adjacent erasing heads is more than two, the device according to the invention is preferably carried out in a manner such that the supply circuits of the heads which are to remain inoperative are either opened or short-circuited. Each of the supply circuits of the inoperative heads can, in this case be shortcircuited by a switch which is coupled with the switch for connecting the supply source to the operative circuit in a manner such that the latter switch cannot be closed until the first-mentioned switch has been opened.

The invention will now be described more fully with reference to the drawing.

Figure 1:
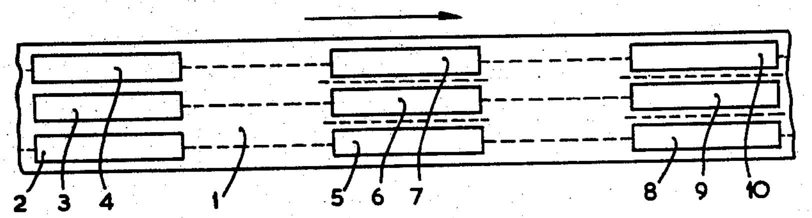
FIG. 1 is a top view of a magnetic tape having three signal tracks passing, in order of succession, along three erasing heads, three recording heads and three reproducing heads.

The magnetic tape 1, of which FIG. 1 shows a small portion on an enlarged scale, passes in the direction of the arrow along three sets of three heads each i.e., in order of succession along three erasing heads 2, 3 and 4, three recording heads 5, 6 and 7 and three reproducing heads 8, 9 and 10.

On the tape, which may have, for example, a width of 12.7 mm., are recorded, side by side, three signal tracks, each having a width of about 2.5 mm., with the distance between the centre lines being about 4 mm. The center lines of these tracks are indicated in the drawing by broken lines.

For various reasons it is often desirable, if not necessary, to arrange the heads of each set accurately with respect to each other with the air gaps of each set aligned in a direction transverse to the direction of travel of the tape. Owing to the small intermediate space between the heads of each set, however, undesired couplings are likely to occur.

In the case of the recording heads and the reproducing heads these couplings can be reduced to a relatively harmless amount by using electromagnetic screening between adjacent heads, as is indicated in FIG. 1 by the broken lines between the heads 5 and 6, 6 and 7, 8 and 9, 9 and 10, respectively. Such screenings are capable of providing a crosstalk damping of —50 db.

Figure 2:
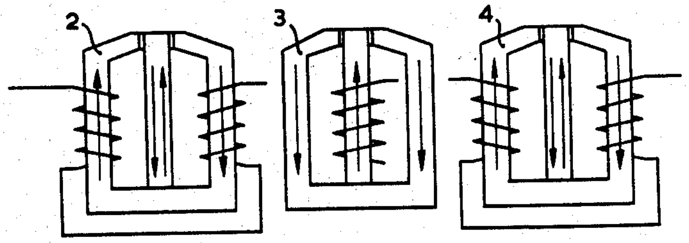
FIG. 2 shows diagrammatically the windings of the three erasing heads, which are illustrated here side by side for clarity.

This method is unserviceable with the erasing heads, however, owing to the comparatively high field intensities occurring during erasing; this is especially true when the spaces between the heads are of the small order of magnitude referred to above. However, the relative coupling between the erasing heads can be reduced substantially to zero by the method according to the invention, which consists partly of winding adjacent heads in different ways, as is shown in FIG. 2.

In this figure, for the sake of clarity, the three erasing heads 2, 3 and 4, each of which comprises a three-leg magnetic circuit, are shown side by side. The actual disposition of the heads relative to the tape is as shown in FIGURE 1. The two outer legs of the heads 2 and 4 are wound so that the flux in the central leg of each is zero; only the central leg of the head 3 has a coupled winding. The arrows in FIG. 2 represent flux directions.

Considering the two heads 2 and 3, it is seen that even if they are near each other in a vertical sense, as is actually the case and shown in FIG. 1, their relative coupling will be substantially zero due to the different placement of the windings on the legs. This will also be true of the heads 3 and 4.

Therefore, if one is concerned with a device for recording and reproducing only two signal tracks, it is sufficient to provide the two erasing heads with different windings, as shown above, in order to provide an independent erasure of the two tracks.

However, if three or more tracks are utilized, every other erasing head is provided with an identical winding, as for example the windings of heads 2 and 4 of FIG. 2; the greater relative coupling between two such heads will thus be considerably reduced due to the spacing between them, but it may nevertheless be troublesome. If, in a device for three tracks having the dimensions mentioned above, the erasing head 2 is traversed by a current of 150 ma., a current of for example about 25 ma. will be induced into the erasing head 4; this current suffices to erase to a great degree the high frequencies in the track traversed by this head.

When three or more tracks are utilized, therefore, an additional measure must be taken to reduce further the coupling between heads of identical windings. The method used to this end in accordance with the invention will now be described with reference to FIG. 3.

Figure 3:
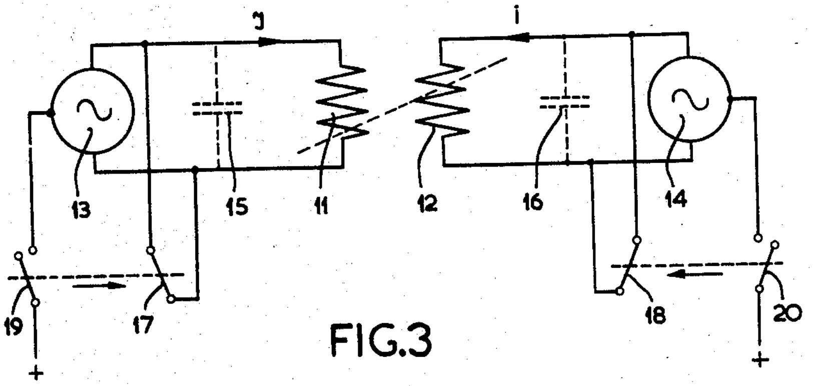
FIG. 3 shows the supply circuits of the two outer erasing heads.

FIGURE 3 shows diagrammatically two erasing heads having identical windings in which decoupling is accomplished by means of two electromagnetically coupled windings 11 and 12. The supply source of the winding 11 is designated by reference numeral 13 and that of the winding 12 by numeral 14.

It has been found that, if the winding 11 is fed by a current I, the current $i$ induced into the circuit of 12 owing to the relative coupling between windings 11 and 12 varies to a great extent with the value of the natural frequency of the circuit of winding 12 relative to the frequency of the supply source 13. The stray capacities of the two circuits are indicated in FIGURE 3 by capacitors 15 and 16, respectively, shown in broken lines. According to the invention, the induced alternating current $i$ due to the current I can be reduced to an extremely low value by short-circuiting said capacitor, thus rendering the capacitive reactance infinite. FIG. 3 illustrates this. The capacity 15 can be short-circuited by means of a switch 17 and the capacity 16 by means of a switch 18. The supply source for the erasing head 11 can be made operative by means of a switch 19 and that for the erasing head 12 by means of a switch 20.

In operation, the short-circuit switches in all circuits not used for erasing are held in the closed position. If alternating current is to be supplied to one of the heads, for example to 11, the switch 19 is closed; however, this is done only after the short-circuit switch 17 has been opened, in order to avoid troublesome audible switching pulses. By coupling the switches 17 and 19 or 18 and 20 with each other, for example, mechanically as is shown in FIG. 3, an interdependent control of the switches in the correct order of succession can be obtained. Instead of using a mechanical coupling, an electric coupling may be employed; for example, a coupling in which the switches 19 and 20 are each controlled by means of a relay which is energized as soon as the switches 17 and 18 respectively are opened.

It will be obvious that the additional measure described to reduce the coupling between heads having identical windings may, if desired, also be used for any erasing heads situated between these heads which have a different arrangement of windings such as, for example, the erasing head 3.

It is to be understood that the invention is not limited to the exact construction described and illustrated, which is merely exemplary of one manner of carrying out the invention.

What is claimed is:

1. A device for selectively erasing a plurality of signal tracks arranged adjacent to each other on a magnetic tape by means of a plurality of erasing heads, the gaps of the heads being aligned in a direction transverse to the tape, each head being coupled to a separate associated track, each head having three magnetic legs including two outer legs and one inner leg and windings coupled to selected legs, the windings on one head being wound on the two outer legs only and the windings on an adjacent head being wound on the inner leg only, the magnetic flux in the two outer legs of said one head being in the opposite directions while the magnetic flux in the two outer legs of the adjacent head is in the same direction.

2. A device as claimed in claim 1, further comprising switch means to selectively short-circuit or open-circuit the supply of alternating current to all heads which are to remain inoperative, said switch means operating in response to the activation of the operative head.

References Cited in the file of this patent

UNITED STATES PATENTS

| | | |
|---|---|---|
| 2,195,192 | Schuller | Mar. 26, 1940 |
| 2,647,167 | Rettinger | July 28, 1953 |
| 2,689,274 | Saeger | Sept. 14, 1954 |
| 2,727,096 | Singer | Dec. 13, 1955 |
| 2,730,570 | Rettinger | Jan. 10, 1956 |